United States Patent [19]

(12) United States Patent
Caviglia et al.

(10) Patent No.: US 10,038,621 B2
(45) Date of Patent: Jul. 31, 2018

(54) APPARATUS AND METHOD FOR COMPUTING END-TO-END PATHS THROUGH A NETWORK COMPRISING A PLURALITY OF NETWORK DOMAINS

(75) Inventors: Diego Caviglia, Vällingby (SE); Giulio Bottari, Livorno (IT); Daniele Ceccarelli, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 46 days.

(21) Appl. No.: 14/386,151

(22) PCT Filed: Apr. 5, 2012

(86) PCT No.: PCT/EP2012/056353
§ 371 (c)(1),
(2), (4) Date: Sep. 18, 2014

(87) PCT Pub. No.: WO2013/149675
PCT Pub. Date: Oct. 10, 2013

(65) Prior Publication Data
US 2015/0163125 A1    Jun. 11, 2015

(51) Int. Cl.
*H04L 12/751* (2013.01)
*H04L 12/715* (2013.01)
(Continued)

(52) U.S. Cl.
CPC .............. *H04L 45/02* (2013.01); *H04L 45/04* (2013.01); *H04L 45/26* (2013.01); *H04L 45/42* (2013.01);
(Continued)

(58) Field of Classification Search
CPC .......... H04L 45/02; H04L 45/50; H04L 45/26
See application file for complete search history.

(56) References Cited

U.S. PATENT DOCUMENTS 8,121,039 B2   2/2012  Gao
8,588,611 B2  11/2013  Long
(Continued)

FOREIGN PATENT DOCUMENTS

| CN | 101296178 A | 10/2008 |
| CN | 102238443 | 11/2011 |
| EP | 2 096 801 | 9/2009 |
| WO | WO 2008/064518 | 6/2008 |

OTHER PUBLICATIONS

International Search Report for International application No. PCT/EP2012/056353, dated Aug. 7, 2012.
(Continued)

*Primary Examiner* — Lonnie V Sweet
(74) *Attorney, Agent, or Firm* — Baker Botts, LLP

(57) ABSTRACT

A network architecture is provided for enabling end-to-end paths to be computed across a plurality of network domains. The network architecture comprises a plurality of child path computation elements associated with a plurality of respective network domains, each child path computation element adapted to compute a path segment within its respective network domain. A parent path computation element adapted to compute an end-to-end path across a plurality of network domains in conjunction with the plurality of respective child path computation elements.

17 Claims, 11 Drawing Sheets

(51) Int. Cl.
    H04L 12/721    (2013.01)
    H04L 12/717    (2013.01)
    H04L 12/723    (2013.01)
    H04L 12/24     (2006.01)

(52) U.S. Cl.
    CPC .............. *H04L 45/44* (2013.01); *H04L 45/50* (2013.01); *H04L 41/12* (2013.01)

(56) References Cited

U.S. PATENT DOCUMENTS

| | | | | |
|---|---|---|---|---|
| 2003/0161304 A1* | 8/2003 | deBoer | .................. | H04L 45/00 370/386 |
| 2012/0308225 A1* | 12/2012 | Long | ....................... | H04L 45/04 398/13 |
| 2013/0034103 A1* | 2/2013 | Chen | ..................... | H04L 45/124 370/400 |
| 2018/0034730 A1* | 2/2018 | Zhao | ..................... | H04L 45/507 |

OTHER PUBLICATIONS

"The Application of the Path Computation Element Architecture to the Determination of a Sequence of Domains in MPLS and GMPLS" by D. King et al. (Old Dog Consulting), Jun. 27, 2012.

"The Application of the Path Computation Element Architecture to the Determination of a Sequence of Domains in MPLS and GMPLS" by D. King et al. (Old Dog Consulting), May 10, 2012.

"The Application of the Path Computation Element Architecture to the Determination of a Sequence of Domains in MPLS and GMPLS" by D. King et al. (Old Dog Consulting), Oct. 4, 2011.

"A Framework for Inter-Domain Multiprotocol Label Switching Traffic Engineering" by A. Farrel et al., Nov. 2006.

"Applicability of the Path Computation Element to Inter-Area and Inter-AS MPLS and GMPLS Traffic Engineering" by D. King et al., Jan. 16, 2012.

State Intellectual Property Office of People's Republic of China Search Report for Application No. 201280072212.X, dated Aug. 22, 2016.

State Intellectual Property Office of People's Republic of China Office Action for Application No. 201280072212.X, dated Sep. 2, 2016.

"The Application of the Path Computation Element Architecture to the Determination of a Sequence of Domains in MPLS and GMPLS" by D. King et al. (Old Dog Consulting), Mar. 11, 2012.

"A Framework for Inter-Domain Multiprotocol Label Switching Traffic Engineering" by A. Farrell et al. (Old Dog Consulting), Nov. 2006.

China Intellectual Property Office, Second Office Action and Search Report for Application No. 201280072212.X (with translation), dated Apr. 28, 2017.

* cited by examiner

APPARATUS AND METHOD FOR COMPUTING END-TO-END PATHS THROUGH A NETWORK COMPRISING A PLURALITY OF NETWORK DOMAINS

PRIORITY

This nonprovisional application is a U.S. National Stage Filing under 35 U.S.C. § 371 of International Patent Application Serial No. PCT/EP2012/056353, filed Apr. 5, 2012 and entitled "Apparatus and Method for Computing End-To-End Paths Through a Network Comprising a Plurality of Network Domains."

TECHNICAL FIELD

The present invention relates to an apparatus and method for computing end-to-end paths through a network comprising a plurality of network domains, and also to network nodes and methods performed in network nodes of such a network.

BACKGROUND

A network domain can be considered to comprise any collection of network elements within a common sphere of address management or path computational responsibility.

Interoperability between different network domains is a key enabler for allowing new technologies to be introduced, and for enabling cost effective transport services to be provided. Interoperability reduces the cost of network deployment as equipment and technology becomes available from multiple sources. The cost of operating a network can be reduced since processes can be streamlined over multiple technologies and vendor equipment.

Interoperability can be addressed at different levels, for example at component level, sub-system and system level and among different network domains and layers, and finally at a data and control plane.

FIG. 1 shows a prior art network architecture whereby multiple network domains 101, 102, 103 are interconnected according to proposals established by the Optical Internetworking Forum (OIF) and the Internet Engineering Task Force (IETF). Network architectures such as those shown in FIG. 1 rely on interfaces known as External Network-to-Network Interfaces (E-NNI) 104, 105, 106 being provided between separate administrative domains (i.e. between network domains 101, 102, 103), thereby allowing client devices 107, 108, 109 to communicate.

The E-NNI is based on the advertisement of a chosen set of domain related information outside its boundaries towards the other administrative domains of the network so as to allow different path computation elements (PCEs) to compute end-to-end paths and related protection/restoration schemes spanning multiple network domains. According to existing standards, path computation over multiple network domains is performed either centrally or in a distributed manner. These are mutually exclusive schemes in the existing standards. Such a framework relies on specific signaling protocols. Standardization bodies are therefore defining a single signaling procedure spanning multiple domains. As such, a prerequisite for interoperability between different network domains according to the prior art is the provision of global standards and specifications.

A disadvantage of such a framework is that it prevents all of the various implementations provided by different network operators or vendors (in the different network domains) from using any customized features, since customized features would not be "understood" by nodes from different vendors.

Furthermore, since mature implementations based on these specifications have to interwork seamlessly, this means that all implementation options are eliminated or transformed to obligatory features. Only mandatory features are retained, and all interpretations of the standards are streamlined. These are further disadvantages of existing frameworks for interoperability between different network domains.

SUMMARY

It is an aim of the present invention to provide a method and apparatus which obviate or reduce at least one or more of the disadvantages mentioned above.

According to a first aspect of the present invention, there is provided a method of computing end-to-end paths through a network comprising a plurality of network domains. The method comprises the steps of computing a path segment within a network domain using a child path computation element associated with the network domain, and computing an end-to-end path across a plurality of network domains using a parent path computation element that computes the end-to-end path in conjunction with the plurality of child path computation elements associated with the respective plurality of network domains.

According to another aspect of the present invention, there is provided a network architecture for enabling end-to-end paths to be computed across a plurality of network domains. The network architecture comprises a plurality of child path computation elements associated with a plurality of respective network domains, each child path computation element adapted to compute a path segment within its respective network domain. The network architecture also comprises a parent path computation element adapted to compute an end-to-end path across a plurality of network domains in conjunction with the plurality of respective child path computation elements.

According to another aspect of the present invention, there is provided a path computation element for computing an end-to-end path across a network comprising a plurality of network domains. The path computation element comprises an interface unit for communicating with a plurality of child path computation elements, each of the child path computation elements associated with a respective network domain and adapted to compute a path segment within its respective network domain. A processing unit is adapted to compute an end-to-end path across a plurality of network domains in conjunction with a plurality of child path computation elements.

According to another aspect of the present invention, there is provided an ingress node of a network domain, the ingress node forming part of a path segment within the network domain, the path segment forming part of an end-to-end path across a plurality of different network domains. The ingress node comprises an input interface configured to receive a traffic signal, a local path identifier and a global path identifier, wherein the local path identifier is computed by a child path computation element local to the network domain, and the global path identifier computed by a parent path computational element associated with a plurality of child path computation elements. A processing unit is adapted to establish a label switched path within the network domain for routing the traffic signal to an egress node of the network domain, the label switched path using the local path identifier to route the traffic signal to the egress node, and the global path identifier to link the path segment to the end-to-end path across the plurality of network domains. An output interface is configured to transmit the traffic signal to the egress node of the network domain using the local path identifier.

According to another aspect of the present invention, there is provided a method of computing a path segment within an ingress node of a network domain, the ingress node forming part of a path segment within the network domain, the path segment forming part of an end-to-end path across a plurality of different network domains. The method comprises the steps of receiving a traffic signal, a local path identifier and a global path identifier, wherein the local path identifier is computed by a child path computation element local to the network domain, and the global path identifier computed by a parent path computational element associated with a plurality of child path computation elements. A label switched path is established within the network domain for routing the traffic signal to an egress node of the network domain, the label switched path using the local path identifier to route the traffic signal to the egress node, and the global path identifier to link the path segment to the end-to-end path across the plurality of network domains. The traffic signal is transmitted to the egress node of the network domain.

According to another aspect of the present invention, there is provided an egress node of a network domain, the egress node forming part of a path segment within the network domain, the path segment forming part of an end-to-end path across a plurality of different network domains. The egress node comprises an input interface configured to receive a label switched path signal from another node in the network domain, the label switched path signal comprising a local path identifier and a global path identifier, the local path identifier having been computed by a child path computation element associated with the network domain, and the global path identifier having been computed by a parent path computational element associated with a plurality of child path computation elements. A processing unit is adapted terminate the received label switched path signal, extract a traffic signal, and associate the global path identifier as an egress label for the traffic signal. An output interface is configured to transmit the traffic signal to an ingress node of another network domain forming part of the end-to-end path, using the egress label.

According to another aspect of the present invention, there is provided an intermediate node of a network domain, the intermediate node forming part of a path segment within the network domain, the path segment forming part of an end-to-end path across a plurality of different network domains. The intermediate node comprises an input interface configured to receive a label switched path signal from another node in the network domain, the label switched path signal comprising a local path identifier and a global path identifier, the local path identifier having been computed by a child path computation element associated with the network domain, and the global path identifier having been computed by a parent path computational element associated with a plurality of child path computation elements. A processing unit is adapted to process the received label switched signal. An output interface is configured to transmit the label switched path signal to another node in the network domain using the local path identifier.

BRIEF DESCRIPTION OF THE DRAWINGS

For a better understanding of the present invention, and to show more clearly how it may be carried into effect, reference will now be made, by way of example only, to the following drawings in which.

DETAILED DESCRIPTION

The embodiments of the present invention relate to apparatus and methods for computing end-to-end paths through a network comprising a plurality of network domains, for example multiple optical networks, and are aimed at enabling network operators to provide multi-domain architectures that are able to allow different vendors to operate under a common control umbrella.

As will be described in further detail below, the embodiments of the invention are concerned with providing a hierarchical architecture to end-to-end path computation though a plurality of network domains, whereby a parent path computation element (parent PCE) operates in conjunction with a plurality of child path computation elements (child PCEs) in order to compute an end-to-end path though different network domains.

The embodiments of the invention have the advantage of avoiding the need for control plane interworking among clouds of different vendors, and are therefore extremely appealing for network operators.

Figure 1:
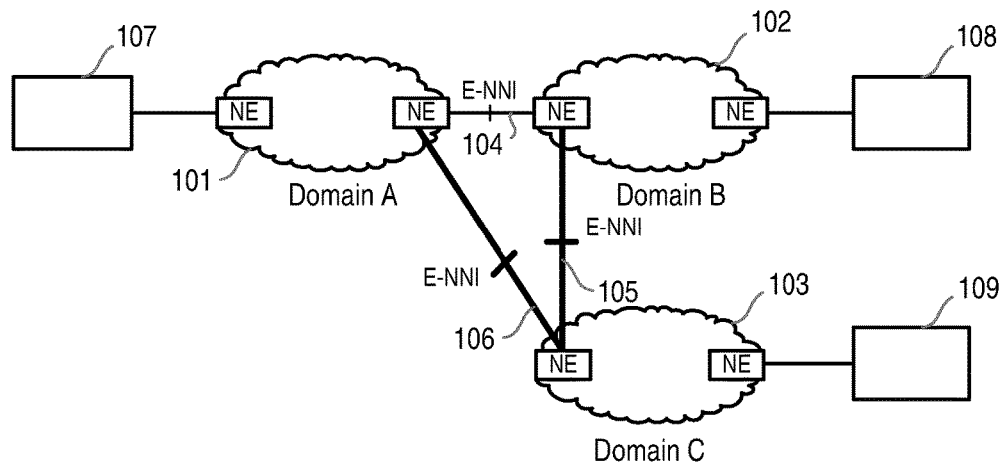
FIG. 1 shows an example of a known network having multiple network domains, employing External Network-to-Network Interfaces, E-NNIs.
Figure 2:
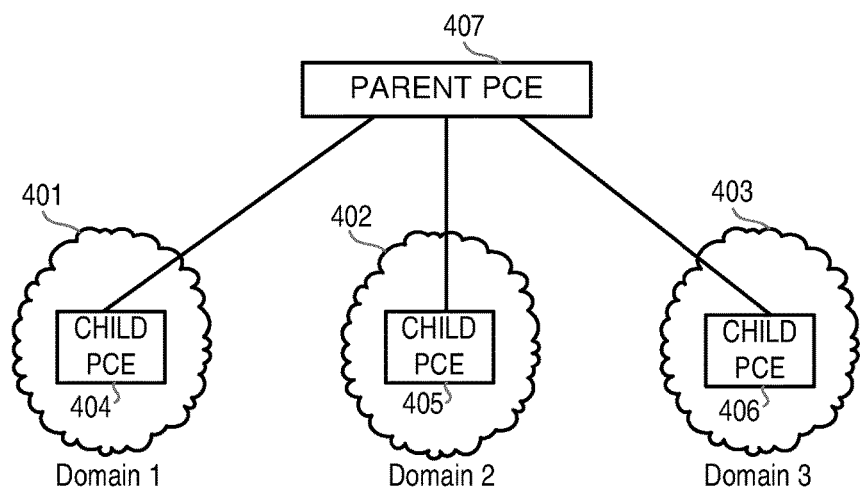
FIG. 2 shows a network according to an embodiment of the present invention.

FIG. 2 illustrates a network architecture according to an embodiment of the present invention, for enabling end-to-end paths to be computed across a plurality of network domains, 401, 402, 403. The network architecture comprises a plurality of child path computation elements 404, 405, 406 associated with the plurality of respective network domains 401, 402, 403. Each child path computation element 404, 405, 406 is adapted to compute a path segment within its respective network domain. A parent path computation element 407 is adapted to compute an end-to-end path across the plurality of network domains 401, 402, 403 in conjunction with the plurality of respective child path computation elements 404, 405, 406.

The embodiment of FIG. 2 effectively provides a hybrid form of both centralised and distributed control for computing an end-to-end path.

A child path computation element 404, 405, 406 is adapted to compute a path segment within its respective network domain using topology information local to that network domain. The child path computation element may be adapted to form a path segment using a traffic engineering label switched path, TE-LSP.

The parent path computation element 407 is adapted to compute the end-to-end path by joining the plurality of path segments computed by the plurality of respective child path computation elements 404, 405, 406.

The network architecture shown in FIG. 2 provides a multi domain architecture that may be based on IETF protocols, and in particular on the stitching of label switched paths (LSPs) independently created by the signaling protocol instance running inside each administrative domain (acting as a child PCE). The parent PCE acts as a centralized entity for each domain, and operates as a PCE having a network management system (NMS) like knowledge of the network. The architecture can work either with a routing protocol running or not. By having a NMS like knowledge of the network, this enables each node to gather topological information relating to the nodes. This allows a PCE Traffic Engineering database to be fed as if a routing protocol was running, such that the solution can either work with a running routing protocol or not.

The embodiment described in FIG. 2 therefore provides a hierarchical PCE approach, whereby a child PCE is acting in each domain with domain local topology information, and a parent PCE operating with an overall view of the network, the parent PCE being in communication with the child PCEs for the computation of end-to-end paths.

Such a communication channel between the parent PCE and child PCEs may consists of the standard PCE-P protocol, for example. It is noted that the manner in which each child PCE gathers domain local topology and traffic information is a vendor issue, and that different alternatives are intended to fall within the scope of the claimed embodiments. Examples include routing or network management systems. This may involve a routing protocol or a network management system populating a Topology Database (TDB, i.e. a database of nodes and links) and/or a traffic engineering database (TED). The parent PCE is configured to have a summarized view of the whole network, based on limited information which it receives about the whole network.

According to one embodiment, the summarized view of the network as seen by the parent PCE comprises information relating to at least the boundary and/or edge nodes of the plurality of network domains, and information relating to the links between the plurality of network domains (inter-domain links).

Figure 3:
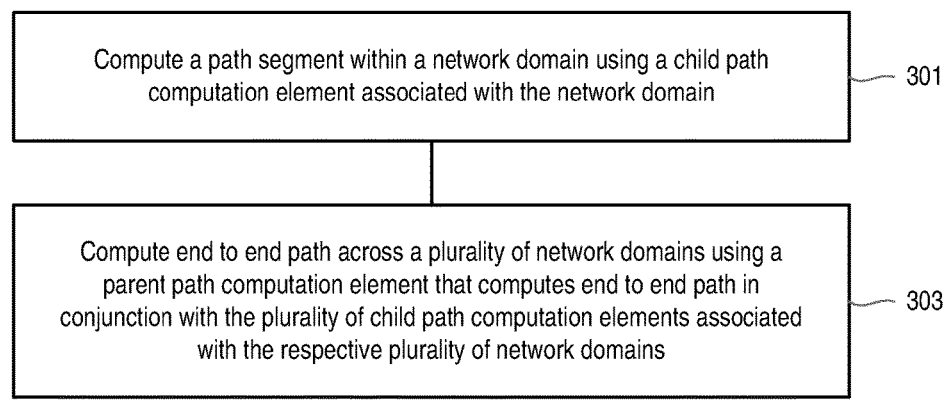
FIG. 3 shows a method of computing end-to-end paths through a network, according to an embodiment of the present invention.

FIG. 3 shows the steps performed by an embodiment of the invention, for computing end-to-end paths through a network comprising a plurality of network domains. In step 301 a path segment within a network domain is computed using a child path computation element associated with the network domain.

In step 303 an end-to-end path across a plurality of network domains is computed using a parent path computation element that computes the end-to-end path in conjunction with a plurality of child path computation elements associated with the respective plurality of network domains. For example, prior to a parent path computation element computing an end-to-end path, comprising border or edge nodes and links to be used (the ingress and egress nodes of each domain, and the links between each network domain), each child path computation element can compute for their own network domain how to route a path from an ingress node to an egress node of its respective network domain. Alternatively, a Parent PCE can compute the end-to-end path and the boundary or edge nodes to be used by each network domain in the end-to-end path, and the links between each network domain, with the child PCEs then computing the path segments within each respective network domain.

A child path computation element computes a path segment within its respective network domain using topology information local to that network domain.

The method may further comprise the step of forming a path segment within a network domain using a traffic engineering label switched path, TE-LSP, further details of which will be described later in the application.

The parent path computation element computes the end-to-end path by joining a plurality of path segments computed by a plurality of respective child path computation elements. The step of joining may further comprise the steps of connecting an egress port and label of a first network domain to an ingress port and label of a second network domain.

Further details of the embodiments described above will be given below in relation to the embodiments of FIGS. 4 to 7.

Figure 4:
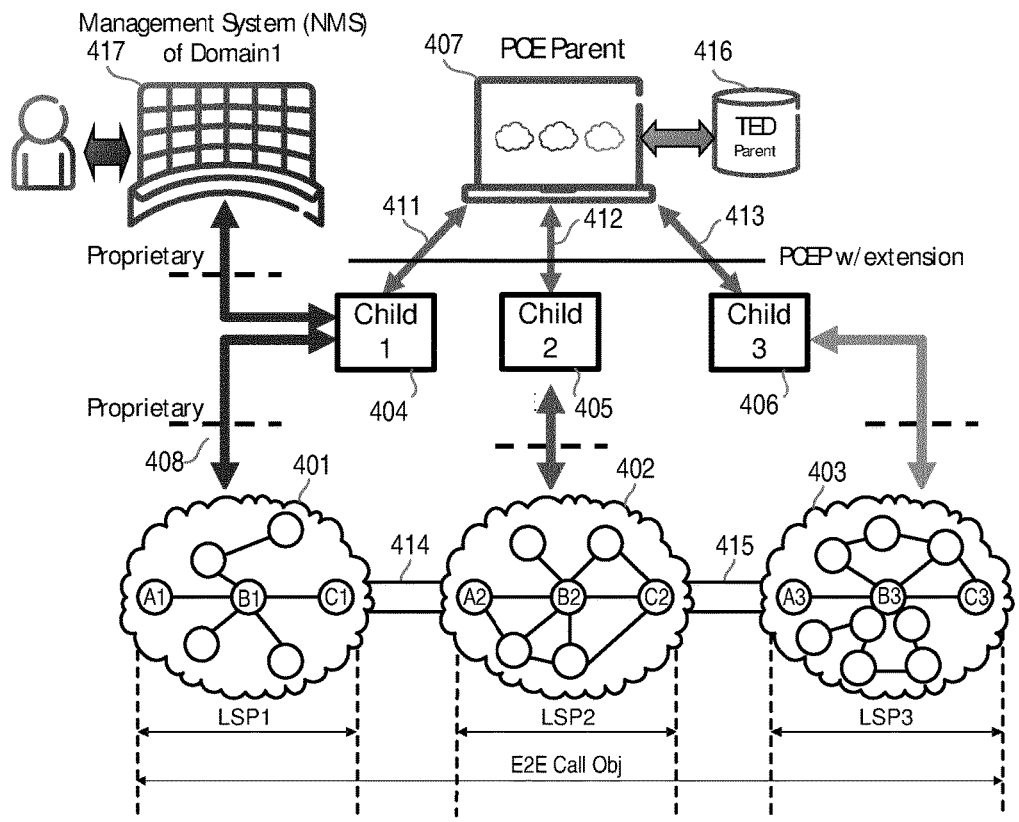
FIG. 4 shows a network according to another embodiment of the present invention.

FIG. 4 illustrates a typical application of the embodiments of the present invention. The network architecture is shown as comprising three network domains, for example, comprising a first network domain 401, a second network domain 402 and a third network domain 403. It is noted that the network may comprise any number of network domains. The network domains may comprise domains provided by different vendors and/or belonging to different operators and/or partitioned for administrative reasons, and are involved in an end-to-end traffic provisioning.

The path computation inside each network domain 401, 402, 403 is performed by a respective child PCE 404, 405, 406. Each network domain can have a different control plane (for example multi-layer GMPLS) or can even be handled by just a network management system without a control plane. Within each network domain each path can be provided independently from the other network domains, which means that each domain can run a different instance of the signaling protocol, or have the paths set up manually via a network management system, with the end result being the same (as no signaling goes from one domain to the other) This allows the backward compatibility of the proposed embodiments with legacy networks.

A parent PCE 407 is provided for controlling the end-to-end path computation. The parent PCE 407 has a summarized view of the network topology. For example, according to one embodiment the parent PCE 407 receives limited information about the capability of the boundary and/or edge nodes of each network domain (including for example edge nodes A1 and C1 of the first network domain 401, the edge nodes A2 and C2 of the second network domain 402, and the edge nodes A3 and C3 of the third network domain 403). The parent PCE 407 also receives information about the links between different network domains. For example, the parent PCE can receive information relating to the bandwidth of the inter-domain links, including for example the link 414 between the first network domain 401 and the second domain 402, and the link 415 between the second network domain 402 and the third network domain 403. The parent PCE therefore receives node and link availability and bandwidth availability on boundary/edge nodes and inter-domain links. Other information may also be received, for example administrative parameters. According to one embodiment, the parent PCE 407 may also receive a summarized view of the internal connectivity of each network domain, which can be in the form of abstraction knowledge of the internal details of a network domain.

As an example, a network management system 417 of the first network domain 401 is shown for enabling a user to activate an end-to-end LSP across the multiple network domains, from an ingress node A1 of the first network domain 401 towards an edge or egress node C3 of the third network domain 403. It will be appreciated that the end-to-end path may be activated in other ways, for example using a separate or independent network management system. The network management system 417 has the full information (full topology knowledge) of the directly managed first domain 401. Furthermore, as will be explained below, the network management system 417 of the first network domain 401 can have a view of the edge nodes of the second network domain 402 and the third network domain 403. This external vision is made available because the first child PCE 404 associated with the first network domain 401 is connected with the parent PCE 407, for example using the PCE-P protocol, while the parent PCE 407 is in hierarchical connection with a second child PCE 405 of the second network domain 402, and a third child PCE of the third network domain 403.

The NMS 417 only requires knowledge of the ingress node and egress node of its own network domain, since this is the only part of the end-to-end path that the NMS 417 needs to know. However, if required, the NMS 417 of the first network domain can gain knowledge of the edge nodes of the other network domains via the parent PCE, which would not be possible with prior art solutions. The information about other edge nodes of other network domains can be used by the parent PCE when computing an end-to-end path.

Figure 5:
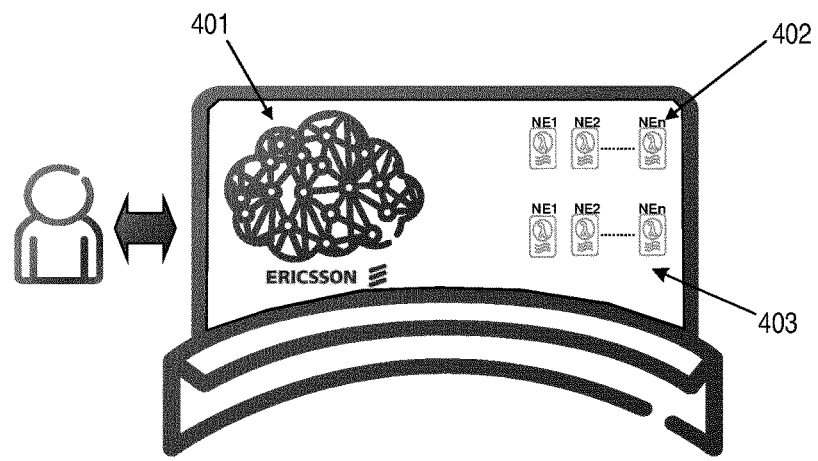
FIG. 5 shows how an example of a user interface for setting up an end-to-end path according to an embodiment of the invention.

An end-to-end path may be created, for example, using the console of the network management system 417 of the first network domain 401, as shown in FIG. 5. It is noted that the end-to-end path may be created in other ways which are intended to fall within the scope of the present invention. A user can activate an LSP by a simple point-and-click on the source node hosted in the directly managed first network domain (for example selecting a source node from one of the nodes of a first network domain 401 operated by a first network operator or vendor), and then on the destination node (for example selecting a destination node from one of the nodes NE1, NE2 . . . NEn of a second network domain 402 or third network domain 403 operated by second and third network operators or vendors). In the example the source node is selected as node A1 of the first domain 401, and the destination node as node C3 of the third network domain 403. The console illustrates nodes of different network domains, such as a first domain, a second domain and a third domain—it is noted however that the console can be configured to select from multiple network domains.

As will be described in greater detail below, the embodiments of the invention ensure that egress control assures that the egress port and label of the first network domain are directly connected to the ingress port and label of the second network domain, and that the egress port and label of the second network domain are directly connected to the ingress port and label of the third domain. This can be assured by the use of a global identifier, such as a Call Object identifier, for example a Call_ID identifier, as described in further detail below in connection with FIGS. 6 and 7a.

Figure 6:
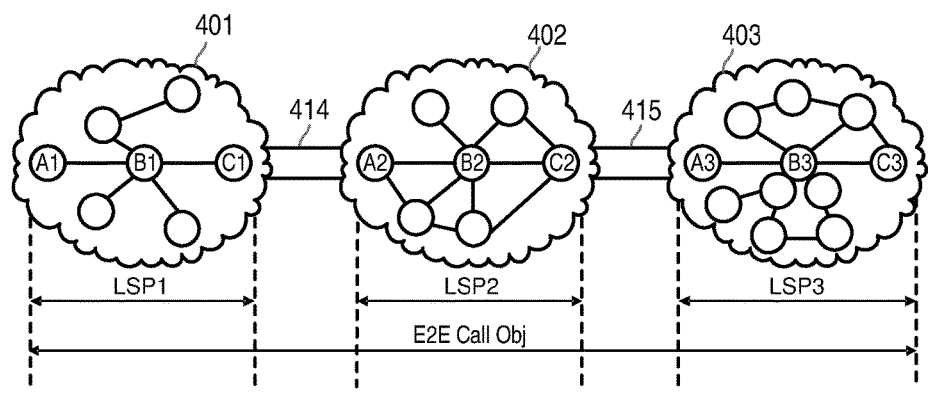
FIG. 6 provides further details of how an end-to-end path may be computed according to an embodiment of the invention.

This is illustrated in FIG. 6, whereby the egress port C1 and label of the first network domain 401 are directly connected to ingress port A2 and label of the second network domain 402, and that the egress port C2 and label of the second network domain 402 are directly connected to ingress port A3 and label of the third domain 403. It can be seen that a separate LSP is established in each of the respective network domains, i.e. LSP1, LSP2, LSP3, with a global identifier used to link the separate path segments to form the end-to-end path. This is achieved, for example, using a global identifier such as a Call Object or Call_ID.

Figure 7A:
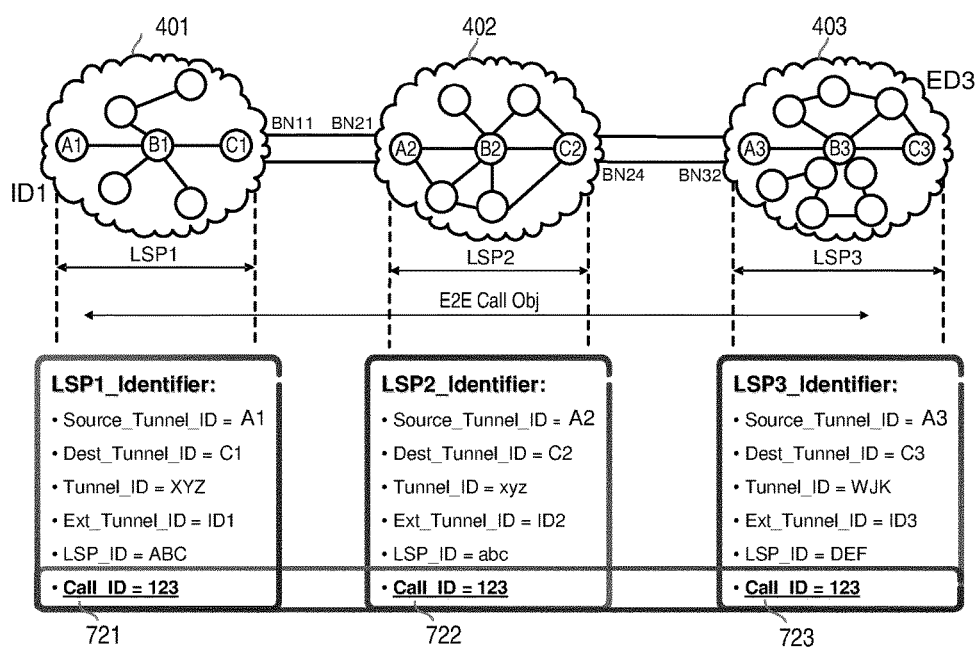
FIG. 7a provides further details of how an end-to-end path may be computed according to an embodiment of the invention.

Referring to FIG. 7a, this illustrates how the global identifier can be realized using a Call Object identifier (Call_Obj of IETF Recommendation RFC 4974), which is used as a signed identifier for the end-to-end service. The Call Object can include a Call_ID, which is a field of the Call Object. The signalling protocol contains objects, with each of them including fields. A first path segment (LSP1) is established in the first network domain 401. Traffic is routed from ingress node A1 to egress node C1 (which may be via one or more intermediate nodes B1, only one shown as an example) using a first local path identifier, that is a path identifier local to the first network domain. In the example the first local path identifier LSP1_identifier comprises:

Source_Tunnel_ID=A1
Dest_Tunnel_ID=C1
Tunnel_ID=XYZ
Ext_Tunnel_ID=ID1
LSP_ID=ABC Likewise, a second path segment (LSP2) is established in the second network domain 402. Traffic is routed from ingress node A2 to egress node C2 (which may be via one or more intermediate nodes B2, only one shown as an example) using a second local path identifier, that is a path identifier local to the second network domain. In the example the second local path identifier LSP2_identifier comprises:

Source_Tunnel_ID=A2
Dest_Tunnel_ID=C2
Tunnel_ID=xyz
Ext_Tunnel_ID=ID2
LSP_ID=abc Likewise, a third path segment (LSP3) is established in the third network domain 402. Traffic is routed from ingress node A3 to egress node C3 (which may be via one or more intermediate nodes B3, only one shown as an example) using a third local path identifier, that is a path identifier local to the third network domain. In the example the third local path identifier LSP3_identifier comprises:

Source_Tunnel_ID=A3
Dest_Tunnel_ID=C3
Tunnel_ID=WJK
Ext_Tunnel_ID=ID3
LSP_ID=DEF However, it can be seen that, in addition to the local path identifier within each network domain, a global identifier is provided which is common to each network domain. The global identifier may be a Call Object, for example a Call_ID object, shown as Call_ID=123 as references 721, 722 and 723 in LSP identifiers LSP1, LSP2 and LSP3 respectively.

Figure 7B:
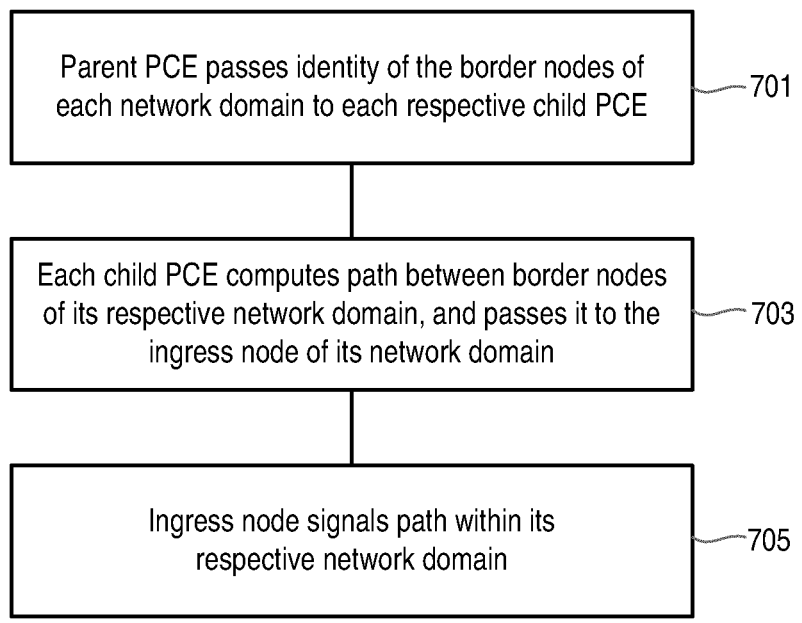
FIG. 7b illustrates the steps performed by an embodiment of the invention, when computing an end-to-end path between a source node of a first network domain and a destination node of another network domain.

FIG. 7b illustrates the steps performed by an embodiment of the invention when computing an end-to-end path between a source node A1 of a first network domain 401, and a destination node C3 of a third network domain 403, via an intermediate second network domain 402, as illustrated in the example of FIG. 4, 6 or 7a.

In step 701 a parent PCE passes information relating to the identity of the border nodes of each network domain to the respective child PCEs of those network domains that form part of the end-to-end path. For example, (A1, C1) are passed to the Child PCE of the first network domain 401, (A2, C2) passed to the Child PCE of the second network domain 402, and (A3, C3) passed to the Child PCE of the third network domain 403.

In step 703 each child PCE computes the path between border nodes of its respective network domain, and passes it to the ingress node of its network domain (for example, child PCE 1 computes A1, B1, C1 and passes it to A1).

In step 705 the ingress node (for example A1) signals the path received via RSVP-TE, for example, within its network domain (for example Path Message sent from A1 to B1 to C1 and Resv Message from C1 to B1 to A1). This is performed for each network domain. The path message includes a local identifier and a global identifier, for example a Call Object with the Call_ID (which has been passed from parent PCE to child PCE to ingress node, with the Call ID).

Figure 8:
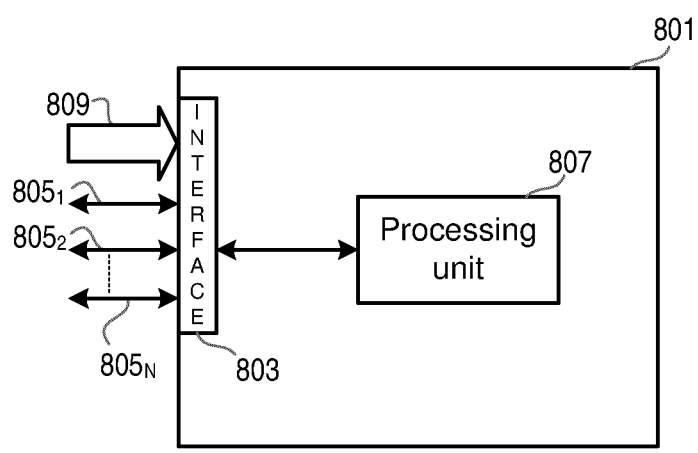
FIG. 8 shows an example of a path computation element according to an embodiment of the invention.

FIG. 8 shows a path computation element 801 according to an embodiment of the invention, for example a parent PCE for computing an end-to-end path across a network comprising a plurality of network domains. The path computation element 801 comprises an interface unit 803 for communicating with a plurality of child path computation elements 805, each of the child path computation elements 805 associated with a respective network domain and adapted to compute a path segment within its respective network domain. The path computation element 801 comprises a processing unit 807 adapted to compute an end-to-end path across a plurality of network domains in conjunction with a plurality of child path computation elements.

The processing unit 807 can be configured to compute the end-to-end path by joining a plurality of path segments computed by a plurality of respective child path computation elements. The parent PCE computes the end-to-end path, and the separate segments are then routed independently within each network domain.

The interface unit 803 can be configured to receive limited information 809 relating to the topology of the network, with the processing unit 807 being configured to compute the end-to-end path using the limited information. The limited information may comprise information relating to the edge nodes and/or boundary nodes of the plurality of network domains, and information relating to the communication links coupling the plurality of network domains.

The limited information may further comprise a summarized view of the topology within a network domain.

The processing unit 807 can be configured to control how an egress port and label of a first network domain are connected to an ingress port and label of a second network domain. There is no label between network domains—traffic is effectively terminated by the egress node of a previous domain, client traffic is extracted and passed to the ingress node of the next domain. An egress label is used to reach the second node of the domain and so on. The label may be a CALL_OBJECT label of the internet engineering task force recommendation RFC 4974.

The processing unit 807 is configured to compute the identity of the border nodes of each network domain that form part of the end-to-end path, and configured to control this information being passed to the respective child PCEs of those network domains. For example, the processing unit 807 may be adapted to compute boundary nodes A1 and C1 of the first network domain, which are passed to the Child PCE of the first domain 401; the boundary nodes A2 and C2 of the second network domain 402, which are passed to the Child PCE of the second network domain 402; and the boundary nodes A3 and C3 of the third network domain 403, which are passed to the Child PCE of the third network domain 403.

It can be seen from the above that the embodiments of the invention provide a hierarchical path computation element architecture, for example using standard enhanced PCE-P protocols for communicating between the parent and child PCE units. In this way the embodiments of the invention provide stitched LSPs for reduced complexity and Call_ID as the end-to-end glue. Further details of stitching can be found in IETF Recommendation RFC4726. Further details of the Call Object can be found in IETF Recommendation RFC4974.

Figure 9:
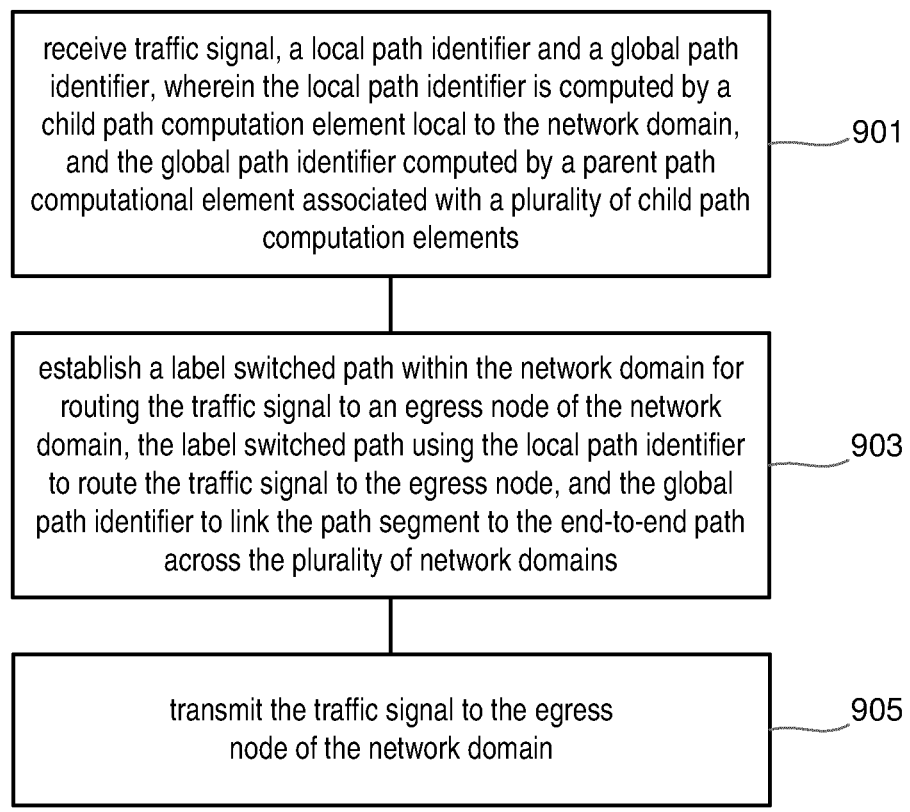
FIG. 9 shows a method performed in an ingress node of a network domain, according to an embodiment of the invention.

FIG. 9 shows the steps performed in an ingress node of a network domain, according to an embodiment of the invention. The ingress node forms part of a path segment within the network domain, the path segment forming part of an end-to-end path across a plurality of different network domains. The method comprises the step receiving a traffic signal, a local path identifier and a global path identifier, wherein the local path identifier is computed by a child path computation element local to the network domain, and the global path identifier is computed selected by a parent path computational element associated with a plurality of child path computation elements, step 901.

In step 903 a label switched path is established within the network domain for routing the traffic signal to an egress node of the network domain, the label switched path using the local path identifier to route the traffic signal to the egress node, and the global path identifier to link the path segment to the end-to-end path across the plurality of network domains.

In step 905 the traffic signal is transmitted to the egress node of the network domain.

The global path identifier may be a call object identifier for the end-to-end path across multiple network domains.

Figure 10:
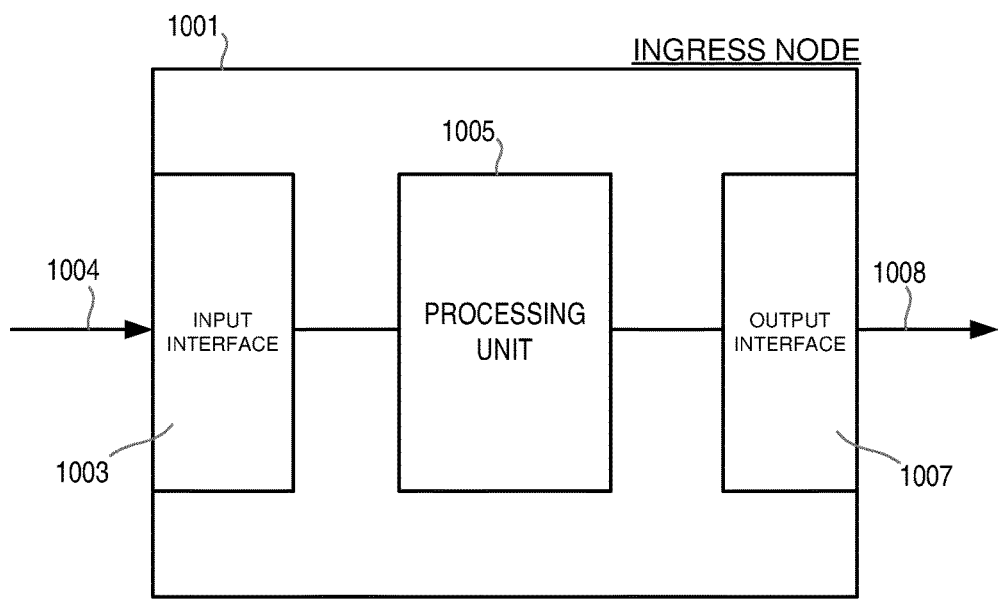
FIG. 10 shows an ingress node of a network domain, according to an embodiment of the invention.

FIG. 10 shows an ingress node 1001 of a network domain (for example an ingress node A1, A2 or A3 of FIG. 2, 4, 6 or 7). The ingress node 1001 forms part of a path segment within the network domain, the path segment forming part of an end-to-end path across a plurality of different network domains. The ingress node 1001 comprises an input interface 1003 for receiving a traffic signal, a local path identifier and a global path identifier (shown as 1004), wherein the local path identifier is computed by a child path computation element local to the network domain, and the global path identifier computed by a parent path computational element associated with a plurality of child path computation elements. A processing unit 1005 is adapted to establish a label switched path within the network domain for routing the traffic signal to an egress node of the network domain, the label switched path using the local path identifier to route the traffic signal to the egress node, and the global path identifier to link the path segment to the end-to-end path across the plurality of network domains. An output interface 1007 is configured for transmitting the traffic signal 1008 to the egress node of the network domain using the local path identifier.

The global path identifier may be a call object identifier for the end-to-end path across multiple network domains.

Figure 11:
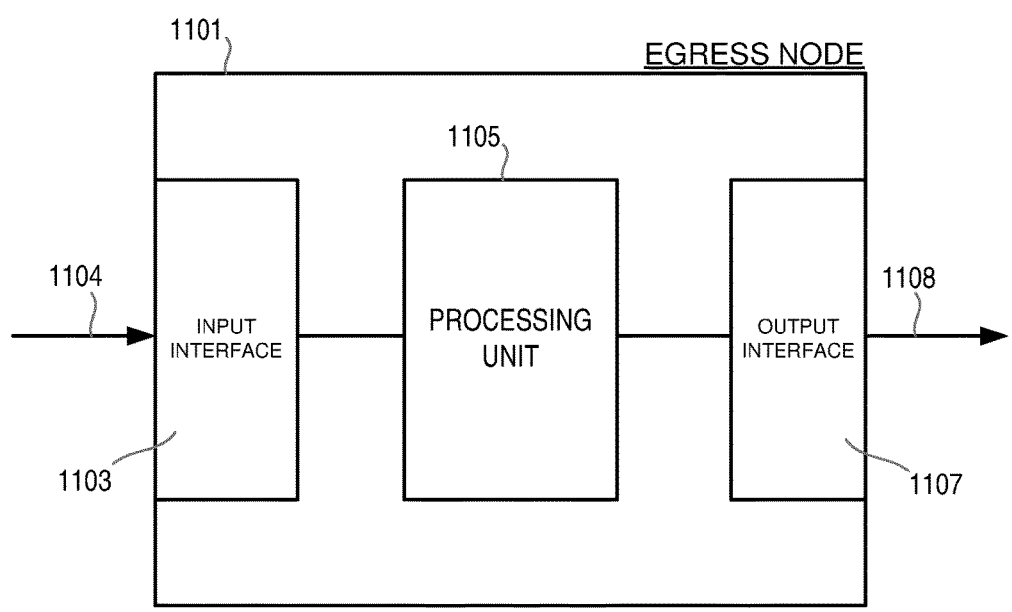
FIG. 11 shows an egress node of a network domain, according to an embodiment of the invention.

FIG. 11 shows an egress node 1101 of a network domain according to an embodiment of the invention (for example an egress node C1, C2). The egress node 1101 forms part of a path segment within the network domain, the path segment forming part of an end-to-end path across a plurality of different network domains. The egress node 1101 comprises an input interface 1103 configured to receive a label switched path signal 1104 from another node in the network domain, the label switched path signal comprising a local path identifier and a global path identifier, the local path identifier having been computed by a child path computation element associated with the network domain, and the global path identifier having been computed by a parent path computational element associated with a plurality of child path computation elements. A processing unit 1105 is adapted to terminate the received label switched path signal, extract a traffic signal, and associate the global path identifier as an egress label for the traffic signal. An output interface 1107 is configured to transmit the traffic signal 1108 to an ingress node (A2) of another network domain forming part of the end-to-end path, using the egress label.

Figure 12:
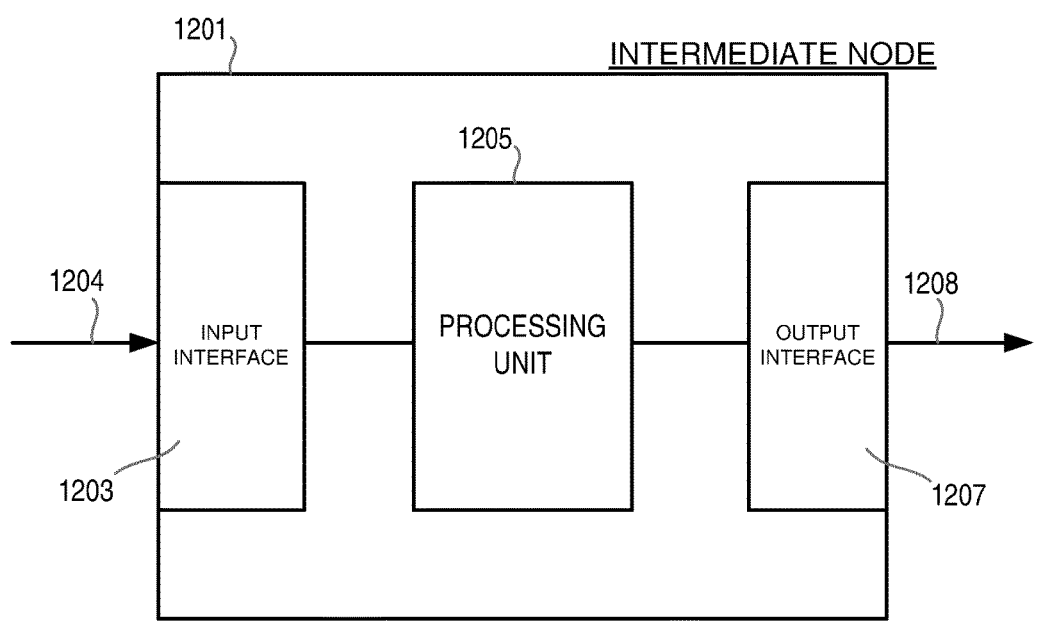
FIG. 12 shows an intermediate node of a network domain, according to an embodiment of the invention.

FIG. 12 shows an intermediate node 1201 of a network domain, according to an embodiment of the present invention The intermediate node 1201 forms part of a path segment within the network domain, the path segment forming part of an end-to-end path across a plurality of different network domains. The intermediate node 1201 comprises an input interface 1203 configured to receive a label switched path signal 1204 from another node in the network domain, the label switched path signal comprising a local path identifier and a global path identifier, the local path identifier having been computed by a child path computation element associated with the network domain, and the global path identifier having been computed by a parent path computational element associated with a plurality of child path computation elements. A processing unit (1205) is adapted to process the received label switched signal. An output interface (1207) is configured to transmit the label switched path signal (1208) to another node in the network domain using the local path identifier.

An advantage of the present invention is that it enables seamless interworking of different network domains, for example GMPLS based networks, with control plane implementations from different vendors/service providers.

It is based on fully standard signaling extensions for signaling messages crossing the domain boundaries but allows for the utilization of customized implementations within the boundary of each domain.

Moreover this architecture does not rely on the utilization of a routing protocol (although it can work with one, but this is not mandatory) so to avoid the flooding of potentially confidential information outside the boundaries of the trusted administrative domain. Routing protocols are used to flood topology information within a domain or outside a domain. Since the embodiments of the invention can work also without a routing protocol, there is no need to flood routing information outside the domain itself The embodiments of the invention provide the ability to control the interface and the label used on the output/downstream interface of an egress node. Further details of Egress Label Control can be found in IETF Recommendation RFC4003.

The embodiments of the invention may be used with various forms of network domains, including but not limited to optical network domains, for example having a control plane for dense wavelength division multiplexing (DWDM) based on the IETF wavelength switched optical network (WSON) specification. The embodiments of the invention allow some proprietary extensions that have been added to WSON standards to improve resiliency to be used (for example Safe Deletion procedures) and manageability (for example WSON Logger).

It can be seen from the above that the embodiments of the invention leverage on existing IETF protocols and on the stitching model, and provide a novel Lightweight Multi Domain Architecture (LMDA).

The embodiments of the invention use the egress label and the call object to identify the end-to-end services, and have the advantage of excluding the end-to-end signaling foreseen in a conventional stitching model, i.e. avoiding signaling between egress and ingress nodes of separate network domains.

Although the examples shown in the embodiments of the invention have been described as forming an end-to end path crossing first, second and third network domains, it is noted that the invention is intended to embrace an end-to-end path crossing any number of network domains.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of computing end-to-end paths through a network comprising a plurality of network domains, the method comprising the steps of:
   computing a first path segment within a first network domain using a child path computation element associated with the first network domain;
   computing a second path segment within a second network domain using a child path computation element associated with second the network domain;
   computing an end-to-end path across a plurality of network domains using a parent path computation element that computes the end-to-end path by joining the first path segment and the second path segment;
   generating, using the parent path computation element, a global identifier for the end-to-end path;
   communicating the global identifier from the parent path computation element to the child path computation element associated with the first network domain;
   generating, using the child path computation element associated with the first network domain, a local path identifier for the first path segment, the local path identifier comprising:
     the global identifier;
     an identifier for the first path segment;
     an identification of an ingress node of the first network domain; and
     an identification of an egress node of the first network domain, wherein the ingress node and the egress node are different nodes, the identifier for the first path segment is distinct from the identifications of the ingress and egress nodes; and
   communicating the local path identifier from the child path computation element associated with the first network domain to the ingress node of the first network domain.

2. A method as claimed in claim 1, wherein a child path computation element computes a path segment within its respective network domain using topology information local to that network domain.

3. A method as claimed in claim 2, further comprising the step of forming a path segment within a network domain using a traffic engineering label switched path, TE-LSP.

4. A method as claimed in claim 1, wherein the parent path computation element computes the end-to-end path by joining a plurality of path segments computed by a plurality of respective child path computation elements.

5. A method as claimed in claim 4, wherein the step of joining further comprises the steps of connecting an egress port and label of a first network domain to an ingress port and label of a second network domain.

6. A network architecture for enabling end-to-end paths to be computed across a plurality of network domains, the network architecture comprising:
 a first child path computation processor associated with a first network domain, the first child path computation processor adapted to compute a first path segment within the first network domain, to generate a local path identifier for the first path segment, and to communicate the local path identifier for the first path segment to an ingress node of the first network domain, the local path identifier comprising:
 an identifier for the first path segment;
 an identification of the ingress node of the first network domain; and
 an identification of an egress node of the first network domain, the ingress node and the egress node are different nodes, the identifier for the first path segment is distinct from the identifications of the ingress and egress nodes;
 a second child path computation processor associated with a second network domain, the second child path computation processor adapted to compute a second path segment within the second network domain; and
 a parent path computation processor adapted to:
 compute an end-to-end path across a plurality of network domains by joining the first path segment and the second path segment;
 generate a global identifier for the end-to-end path, the local path identifier further comprising the global identifier; and
 communicate the global identifier to the first child path computation processor.

7. A network architecture as claimed in claim 6, wherein a child path computation processor is further adapted to compute a path segment within its respective network domain using topology information local to that network domain.

8. A network architecture as claimed in claim 7, wherein a child path computation processor is further adapted to form a path segment using a traffic engineering label switched path, TE-LSP.

9. A network architecture as claimed in claim 6, wherein the parent path computation processor is adapted to compute the end-to-end path by joining a plurality of path segments computed by a plurality of respective child path computation processors.

10. A path computation element for computing an end-to-end path across a network comprising a plurality of network domains, the path computation element comprising:
 an interface for communicating with a plurality of child path computation elements comprising:
 a first child path computation element associated with a first network domain, the first child path computation element adapted to compute a first path segment within the first network domain, to generate a local path identifier for the first path segment, and to communicate the local path identifier for the first path segment to an ingress node of the first network domain the local path identifier comprising:
 an identifier for the first path segment;
 an identification of the ingress node of the first network domain; and
 an identification of an egress node of the first network domain, the ingress node and the egress node are different nodes, the identifier for the first path segment is distinct from the identifications of the ingress and egress nodes; and
 a second child path computation element associated with a second network domain, the second child path computation element adapted to compute a second path segment within the second network domain; and
 a processor adapted to:
 compute an end-to-end path across a plurality of network domains by joining the first path segment and the second path segment;
 generate a global identifier for the end-to-end path, the local path identifier further comprising the global identifier; and
 communicate the global identifier to the first child path computation element.

11. A path computation element as claimed in claim 10, wherein the processor is configured to compute the end-to-end path by joining a plurality of path segments computed by a plurality of respective child path computation elements.

12. A path computation element as claimed in claim 10, wherein the interface is configured to receive limited information relating to the topology of the network, and wherein the processor is configured to compute the end-to-end path using the limited information, wherein the limited information relates to:
 information relating to the edge nodes and/or boundary nodes of the plurality of network domains; and
 information relating to the communication links coupling the plurality of network domains.

13. A path computation element as claimed in claim 12, wherein the processor is configured to compute the identity of border nodes of each network domain forming part of an end-to-end path, and configured to communicate the identity of the boundary nodes of each network domain to the respective child path computation element of the network domain.

14. An ingress node of a first network domain, the ingress node forming part of a first path segment within the first network domain, the first path segment forming part of an end-to-end path across a plurality of different network domains; the ingress node comprising:
 an input interface configured to receive a traffic signal, a local path identifier and a global path identifier, wherein the local path identifier is computed by a first child path computation element local to the first network domain and communicated by the first child path computation element to the ingress node, the global path identifier computed by a parent path computational element by joining the first path segment and a second path segment computed by a second child path computation element local to a second network domain, the global path identifier communicated by the parent path computational element to the first child path computation element, the local path identifier comprising:
the global path identifier;
an identifier for the first path segment;
an identification of the ingress node; and
an identification of an egress node of the first network domain, the ingress node and the egress node are different nodes, the identifier for the first path segment is distinct from the identifications of the ingress and egress nodes;
a processor adapted to establish a label switched path within the first network domain for routing the traffic signal to the egress node of the network domain, the label switched path using the local path identifier to route the traffic signal to the egress node, and the global path identifier to link the path segment to the end-to-end path across the plurality of network domains, and
an output interface configured to transmit the traffic signal to the egress node of the first network domain using the local path identifier.

15. An ingress node as claimed in claim 14, wherein the global path identifier comprises a call object identifier.

16. A method of computing a path segment within an ingress node of a first network domain, the ingress node forming part of a first path segment within the network domain, the first path segment forming part of an end-to-end path across a plurality of different network domains, the method comprising the steps of:
receiving a traffic signal, a local path identifier and a global path identifier, wherein the local path identifier is computed by a first child path computation element local to the first network domain and communicated by the first child path computation element to the ingress node of the first network domain, the global path identifier computed by a parent path computational element by joining the first path segment and a second path segment computed by a second child path computation element local to a second network domain, the global path identifier communicated by the parent path computational element to the first child path computation element, the local path identifier comprising:
the global path identifier;
an identifier for the first path segment;
an identification of the ingress node; and
an identification of an egress node of the first network domain, the ingress node and the egress node are different nodes, the identifier for the first path segment is distinct from the identifications of the ingress and egress nodes;
establishing a label switched path within the first network domain for routing the traffic signal to the egress node of the first network domain, the label switched path using the local path identifier to route the traffic signal to the egress node, and the global path identifier to link the path segment to the end-to-end path across the plurality of network domains; and
transmitting the traffic signal to the egress node of the first network domain.

17. A method as claimed in claim 16, wherein the global path identifier is a call object identifier for the end-to-end path across multiple network domains.

* * * * *